(12) United States Patent
Tamaoka et al.

(10) Patent No.: US 7,550,883 B2
(45) Date of Patent: Jun. 23, 2009

(54) ROTOR HUB, SPINDLE MOTOR, AND RECORDING DISK DRIVING APPARATUS

(75) Inventors: Takehito Tamaoka, Kyoto (JP); Kazushi Miura, Kyoto (JP)

(73) Assignee: Nidec Corporation, Kyoto (JP)

( * ) Notice: Subject to any disclaimer, the term of this patent is extended or adjusted under 35 U.S.C. 154(b) by 530 days.

(21) Appl. No.: 11/163,479

(22) Filed: Oct. 20, 2005

(65) Prior Publication Data

US 2006/0082247 A1    Apr. 20, 2006

(30) Foreign Application Priority Data

Oct. 20, 2004    (JP)    ............... 2004-305705

(51) Int. Cl.
*H02K 21/16*    (2006.01)
*H02K 1/27*    (2006.01)
*H02K 1/00*    (2006.01)

(52) U.S. Cl. ............... 310/67 R; 310/261; 310/254; 360/98.07; 360/99.08

(58) Field of Classification Search ............... 310/67 R, 310/85, 88, 254, 261; 360/68.07, 99.07, 360/99.08
See application file for complete search history.

(56) References Cited

U.S. PATENT DOCUMENTS

| 5,224,782 A | 7/1993 | Miwa et al. |
| 6,271,988 B1 | 8/2001 | Papst |
| 6,411,463 B1 * | 6/2002 | Janik et al. ............... 360/97.01 |
| 6,759,784 B1 * | 7/2004 | Gustafson et al. ........... 310/254 |
| 2004/0061404 A1 * | 4/2004 | Fujii et al. ................... 310/216 |

FOREIGN PATENT DOCUMENTS

| JP | H05-094669 A | 4/1993 |
| JP | 2003-204642 A | 7/2003 |
| JP | 2004-247013 A | 9/2004 |
| WO | WO98/44500 | 10/1998 |
| WO | WO2005/122171 A1 | 12/2005 |

\* cited by examiner

*Primary Examiner*—Quyen Leung
*Assistant Examiner*—David W. Scheuermann
(74) *Attorney, Agent, or Firm*—Volentine & Whitt, PLLC

(57) ABSTRACT

A spindle motor according to an embodiment of the invention includes a rotor hub formed of a ferromagnetic material and a rotor magnet held by the rotor hub. The rotor hub has a flange having a shield surface that faces an upper end surface of the rotor magnet via a clearance in the axial direction and formed of a ferromagnetic material. On the outside in the radial direction of an outer peripheral surface of the rotor magnet in the flange, a rim projected downward from the shield surface of the flange is formed.

22 Claims, 9 Drawing Sheets

ROTOR HUB, SPINDLE MOTOR, AND RECORDING DISK DRIVING APPARATUS

BACKGROUND OF THE INVENTION

1. Field of the Invention

The present invention relates to a rotor hub, a spindle motor having the rotor hub, and a recording disk driving apparatus having the spindle motor.

2. Background Art

FIG. 9 shows the structure of a conventional spindle motor. A base plate 3 is disposed below a rotor magnet 1 and a stator 2 in the axial direction. The rotor magnet 1 is attached to a rotor hub 4 formed of a ferromagnetic material. A flange 4c as a part of the rotor hub 4 extending to the outside in the radial direction is formed above the rotor magnet 1. On the stator 2, a shield plate 5 that shields an area upper than the stator 2 from a magnetic flux generated by the stator 2 is provided so as to cover the stator 2 from the top.

The rotor magnet 1 is an annular-shaped permanent magnet. The rotor magnet 1 is polarized in the radial direction and has four N poles and four S poles which are alternately arranged in the circumferential direction in each of its outer and inner circumferences. In order to miniaturize a spindle motor and increase torque and efficiency, a permanent magnet with extremely high magnetic flux density is used as the rotor magnet 1.

The stator 2 includes a plurality of teeth 2a formed of a ferromagnetic material and a coil 2c wound around the teeth 2a. When a current is passed to the coil 2c, a magnetic field is generated in the stator 2. The magnetic field generated by the stator 2 and a magnetic field generated by the rotor magnet 1 interact each other. The rotor magnet 1 is rotatably supported by the stator 2 and its magnetic interaction makes the rotor magnet 1 generate a rotary force. At this time, the rotor magnet 1 and the stator 2 form a magnetic circuit, and magnetic fluxes are distributed periodically with rotation of the rotor magnet 1 in accordance with a predetermined rule. The inner circumference of the rotor magnet 1 is attached to the rotor hub 4 made of a ferromagnetic material and is magnetically short-circuited so that the magnetic circuit is easily formed. Similarly, in the outer circumference of the stator 2, an annular-shaped core back (not shown) is formed to short-circuit the teeth 2a adjacent to each other in the circumferential direction.

In the rotor magnet 1, even in the state where a current is not passed to the coil 2b, a magnetic field is generated. Since part of the magnetic flux that generates a magnetic field of the rotor magnet 1 flows to the teeth 2a and also in the vertical direction, if a magnetic path is not formed by a material having higher magnetic permeability than air, the magnetic flux is formed in the axial direction and the vertical direction.

In the case where an attractive force acts between the rotor magnet 1 and the stator 2, for example, most of magnetic fluxes generated in the outer circumference of the rotor magnet 1 flow to the stator 2 side.

On the other hand, in the case where a repulsive force acts between the rotor magnet 1 and the stator 2, the magnetic fluxes of the rotor magnet 1 and the stator 2 are generated above and below the rotor magnet 1 and the stator 2. Therefore, if a magnetic path is not formed by a material having higher magnetic permeability than air, the magnetic fluxes are formed above and below.

The rotor hub 2 is attached to a rotary portion and the shield plate 5 is attached to a fixed portion. Consequently, they have to be unavoidably apart from each other only by a predetermined interval, so that a space is produced between the rotor hub 4 and the shield plate 5 and a magnetic flux leaks from the space.

With reduction in thickness of spindle motors, in some cases, it is difficult to provide a portion to which the shield plate is attached on the side of the fixed portion.

Conventionally, magnetic flux is a quantity of magnetism by which materials are distributed three-dimensionally. Since the magnetic flux density decreases in inverse proportional to the cube of distance, in the case where the size of a spindle motor is sufficiently large, a magnetic flux leakage of such a degree hardly becomes a problem.

In recent years, however, miniaturization and reduction in thickness of the spindle motor is particularly in increasing demand. The number of cases where a device using a magnetic field has to be disposed in a portion to which the above-described leaked magnetic flux is related is increasing. When a magnetic material is allowed to be in contact with the upper end of the rotor magnet to short-circuit the magnetic flux, the quantity of the magnetic flux interacting with the stator decreases. Consequently, the motor driving efficiency called torque constant deteriorates.

In recent years, electronic information recording apparatuses such as a hard disk drive are requested to realize increase in capacity and reduction in size and thickness. A hard disk drive has a recording disk obtained by forming a thin film of a magnetic material on a disk of non-magnetic material, and a magnetic head is disposed close to the recording disk. The magnetic head writes/reads information onto/from the recording disk.

When the magnetic circuit of a spindle motor is disposed in the position near the magnetic head and the recording disk, there is a case such that an error occurs in writing or reading of information due to the influence of leaked magnetic flux. The hard disk drive is sensitive also to magnetic flux which becomes very weak in association with increase in density of information written onto the recording disk. When the hard disk drive becomes smaller and thinner, the distance between the magnetic head and the recording disk, and the magnetic circuit of the spindle motor becomes shorter. Since a hard disk drive is often mounted on a portable device and driven by a dry battery, a battery charger, or the like, it is necessary to improve driving efficiency as much as possible.

BRIEF SUMMARY OF THE INVENTION

According to the present invention, leakage of magnetic flux of a rotor magnet and a stator to the outside of a motor can be considerably reduced.

Further, according to the invention, a recording disk driving apparatus in which errors occurring when a magnetic head writes/reads information to/from a recording disk are reduced can be provided.

Furthermore, according to the invention, a rotor hub having high reliability and high durability, a spindle motor having the rotor hub, and a recording disk driving apparatus having the spindle motor can be provided.

A spindle motor as an example of the invention includes a stator having a plurality of teeth disposed in a radial pattern from around a center axis and coils each wound around each of the plurality of teeth, and a rotor rotatably supported by a bearing mechanism around the center axis.

The rotor includes an annular-shaped rotor magnet having a poles facing the plurality of teeth in a radial direction with a first clearance therebetween, and a flange disposed above the rotor magnet, having a shield surface that faces an upper end surface of the rotor magnet via a clearance in the axial direction, and made of a ferromagnetic material.

Further, the rotor includes a disk mounting portion disposed above the flange in the axial direction, on which the recording disk is mounted, and a rim formed by the shield surface being curved downward in the axial direction at radially outward area to the outer peripheral surface of the rotor magnet.

A spindle motor as an example of the invention can reduce leaked magnetic flux. Therefore, a device using a magnetic field such as a magnetic head or a magnetic disk can be disposed in an area closer to the rotor magnet as compared with a conventional device.

In addition, when the rotor hub is miniaturized, rigidity of the rotor hub itself deteriorates. However, by providing the rim which reinforces the flange, the rigidity of the flange can be increased.

DITAILED DESCRIPITION OF THE INVENTION

Embodiments of the present invention will be described hereinbelow with reference to FIG. 1 to 8. When a positional relation or a direction of each member is described by using vertical and horizontal directions in the description of the invention, it refers to the positional relation or direction in the diagram, not a positional relation or direction of the member assembled in an actual apparatus.

First Embodiment

Figure 1:
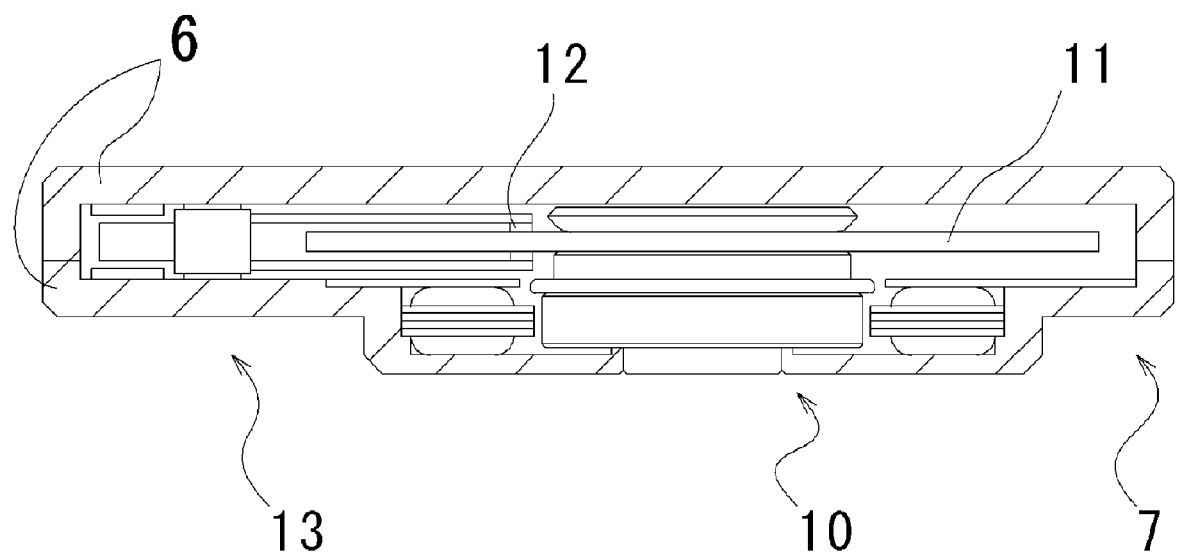
FIG. 1 is a longitudinal sectional view showing a recording disk driving apparatus according to an embodiment of the invention.

FIG. 1 is a longitudinal sectional view showing an example of a hard disk drive as a recording disk driving apparatus of the invention. A hard disk drive 7 includes a housing 6 constructing an internal space, a disc-shaped recording disk 11 on which information is to be recorded, an access unit 13 having a magnetic head 12 that reads/writes information from/to the recording disk 11 and an actuator that moves the magnetic head 12, and a spindle motor 10 that rotates the recording disk 11. The recording disk 11 is made of glass and whose surface is coated with a magnetic material. The magnetic head 12 magnetizes or demagnetizes a portion of the magnetic material on the recording disk 11 in accordance with a signal, thereby writing information on the recording disk. The magnetic head 12 converts a pattern of the magnetized portion on the recording disk 11 into an electric signal, thereby reading information.

Figure 2:
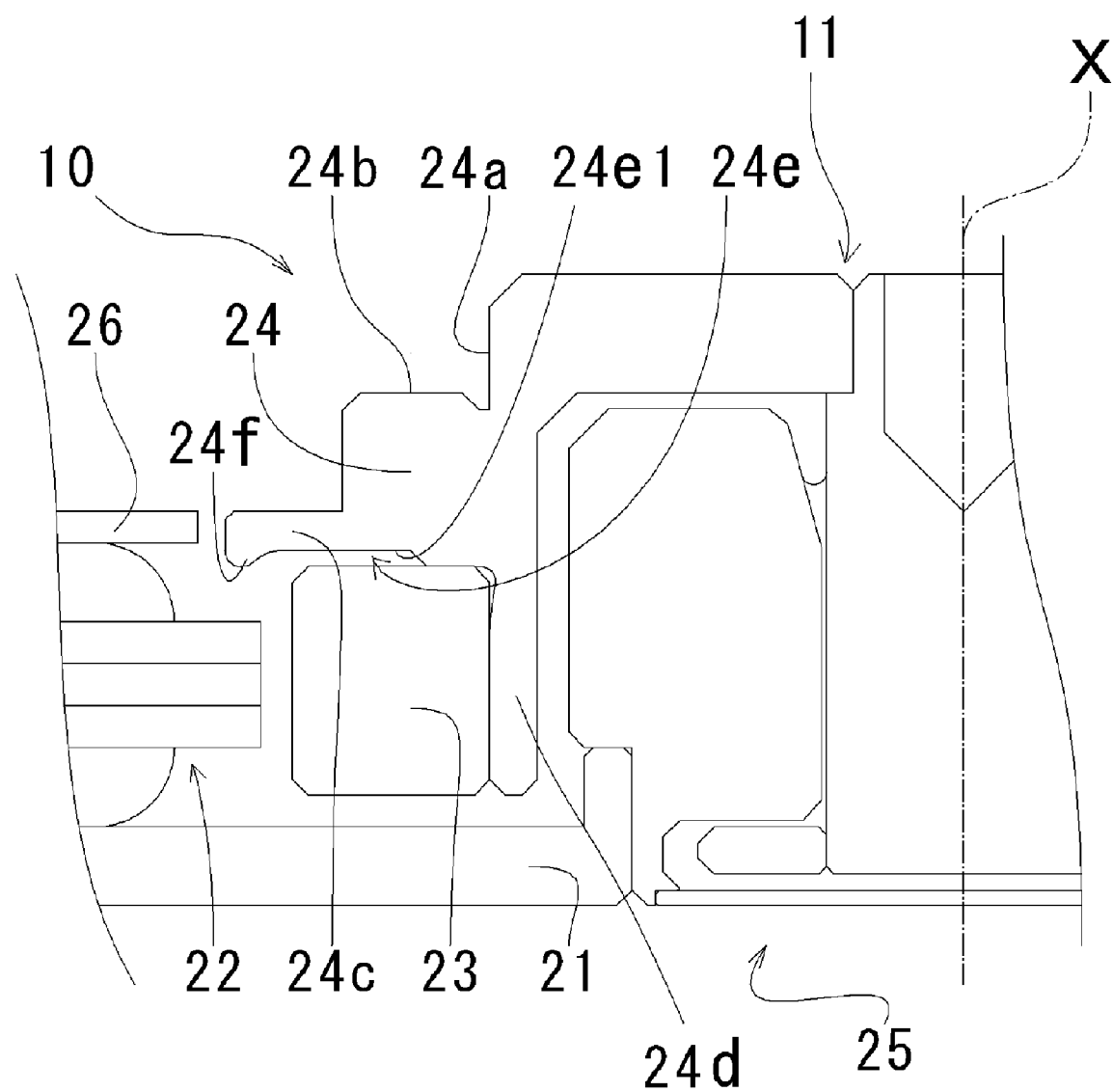
FIG. 2 is a longitudinal sectional view showing a main portion of a spindle motor in FIG. 1.
Figure 4:
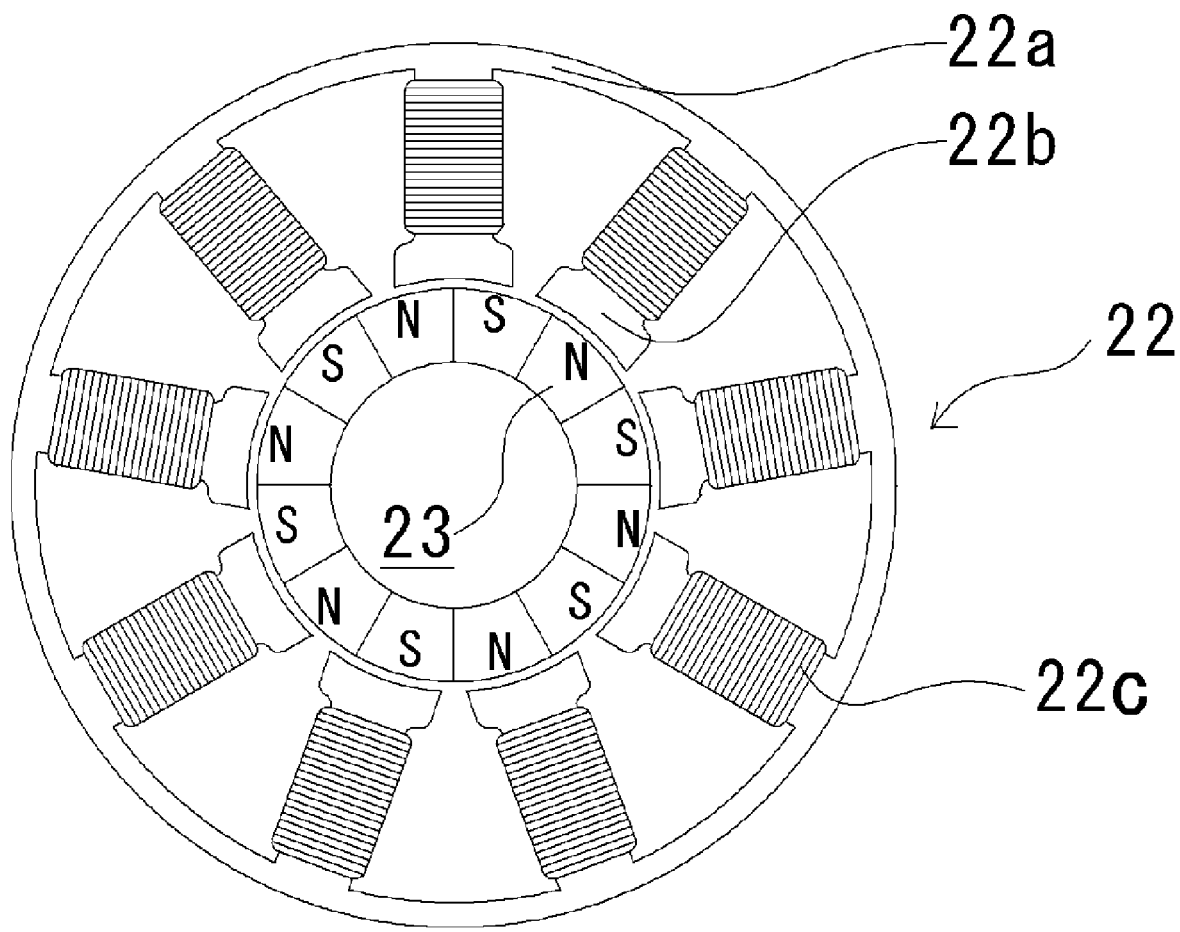
FIG. 4 is a top plan view of a rotor magnet and a stator in the spindle motor in FIG. 2.

FIG. 2 is a cross sectional of a main portion of the embodiment of the spindle motor 10 in FIG. 1. The spindle motor 10 includes a base plate 21 which is at least a part of the housing of the hard disk drive 7, a bearing 25 attached in the center of the base plate 21, and a rotor 11 rotatably supported by the bearing 25. A stator 22 is attached to the base plate 21. The stator 22 includes, as shown in FIG. 4, an annular-shaped core back 22b, a plurality of teeth 22a radially disposed and extending from the inner circumference of the core back 22b to the inside in the radial direction, and coils 22c each wound around each of the plurality of teeth 22a. On the upper side in the axial direction of the stator 22, a shield plate 26 formed of a ferromagnetic material is provided so as to cover the stator 22 from above. When the spindle motor 10 rotates, the shield plate 26 shields an area above the stator 22 from magnetic flux generated in mainly by the stator 22.

As the bearing 25, a fluid dynamic bearing having excellent silence and rotation stability is used in the embodiment.

On the other hand, a rotor hub 24 made of a ferritic stainless steel as a ferromagnetic material is rotatably supported by the bearing 25. The rotor hub 24 includes an outer circumference 24a around which the center hole of the recording disk 11 is fit, a disk mounting portion 24b which extends from the outer circumference 24a to the outside in the radial direction and on which the recording disk 11 is mounted, and a flange 24c extending from the disk mounting portion 24b to the outside in the radial direction.

The rotor hub 24 has a cylindrical portion 24d on the lower side in the axial direction of the outer circumference 24a, and a recess 24e that is recessed upward in the axial direction from the lower end of the flange 24c. An annular-shaped rotor magnet 23 is in contact with and held by the outer periphery of the cylindrical portion 24d and an inner part of the lower end of the flange 24c. The rotor magnet 23 faces the stator 22 with a first clearance d1 (refer to FIG. 3) in the radial direction and faces a shield surface 24e1 of the recess 24e (upper end surface in FIG. 2) via a second clearance d2 (refer to FIG. 3) in the axial direction. In the embodiment, as shown in FIG. 4, the rotor magnet 23 is polarized in the radial direction and has six S poles and six N poles which are alternately disposed in the circumferential direction in the outer circumference.

In the outermost portion in the radial direction of the flange 24c, a rim 24f projected downward in the axial direction from the shield surface 24e1 of the recess 24e is formed. The height of the rim 24f to the lower side in the axial direction is almost the same as the second clearance d2.

Figure 3:
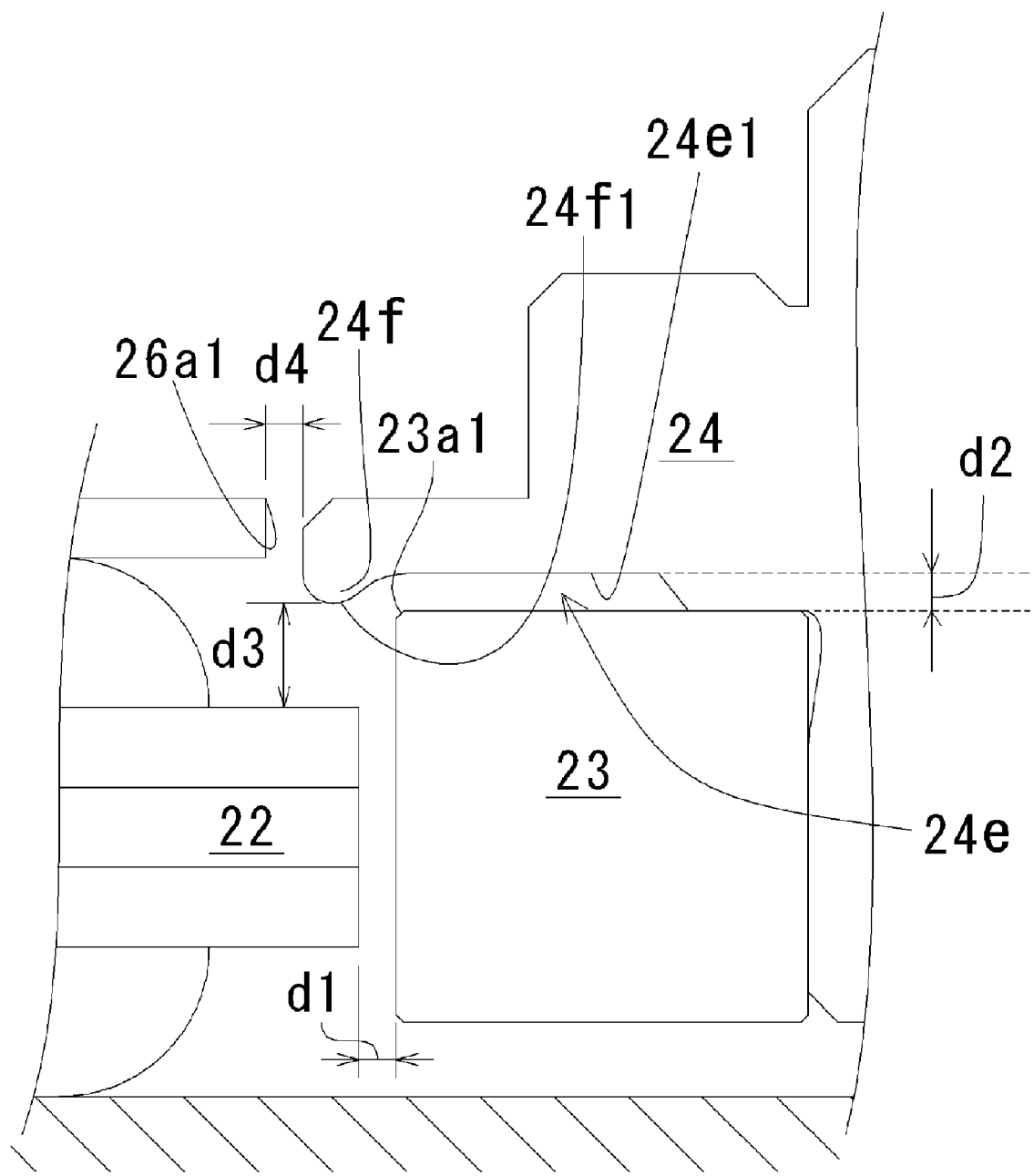
FIG. 3 is a longitudinal sectional view showing a main portion of the spindle motor in FIG. 1.

Next, the positional relation between the shield plate 26 and the flange 24c will be described in detail with reference to FIG. 3. In FIG. 3, on assumption of providing a first reference line extending from an upper edge 23a1 of the peripheral surface of the rotor magnet 23 toward a tip 24f1 of the rim 24f and a second reference line extending from the upper edge 23a1 of the peripheral surface of the rotor magnet 23 toward an upper corner 26a1 of the inner circumference of the shield plate 26, the angle of seeing the second reference line from the first reference line is always negative. Specifically, the rim 24f and the shield plate 26 are disposed so that the upper edge 23a1 of the rotor magnet 23 cannot be visually recognized at least from above of the rotor hub 24.

A third clearance d3 between the rim 24f and the stator 22 is wider than the first clearance d1 between the outer peripheral surface of the rotor magnet 23 and the inner peripheral surface of the stator 22. By making a fourth clearance d4 between the inner peripheral edge of the shield plate 26 and the outer peripheral edge of the flange 24c smaller than the third clearance d3, leaked magnetic flux can be further reduced.

Magnetic flux leaked from the fourth clearance d4 between the rotor 11 and the shield plate 26 to the outside of the motor will be described as leaked magnetic flux.

In the embodiment, as an example, the leaked magnetic flux in the state where no current is passed to the coils 22c was measured. In the following description, the expression "magnetic flux enters" means that magnetic flux flows from the outside of a member to another member, penetrates the surface of the another member, and enters the another member. The expression "magnetic flux goes out" means that magnetic flux in a member penetrates the surface of the member and goes to the outside.

As described above, the second clearance d2 is formed between the upper end surface of the rotor magnet 23 and the shield surface 24e1 of the recess 24e, so that magnetic flux of the rotor magnet 23 is not short-circuited by the rotor hub 24. Therefore, the magnetic flux in a major part especially in the outer circumference of the rotor magnet 23 flows to the stator 22 side. The magnetic flux generated especially from an upper portion of the outer circumference of the rotor magnet 23 is attracted by the rim 24f and enters the rim 24f.

Consequently, when a magnetic flux distribution of a conventional structure in which the rim 24f is not formed is compared with a magnetic flux distribution of the embodiment, magnetic flux which is conventionally leaked to the area above the flange 24c (the outside of the motor) is captured by the rim 24f and enters the flange 24c. That is, since a part in which the magnetic flux tends to flow (the rim 24f in the embodiment) is formed in a place rather than a configuration in which magnetic flux enters the flange 24c from multiple directions, the magnetic flux flows in the rim 24f more easily and leakage is suppressed.

The magnetic flux entered the flange 24c enters the rotor magnet 23 via the lower end of the inner circumference of the flange 24c and the cylindrical portion 24d.

Conventionally, magnetic flux leaks greatly, especially, from a clearance between the rotor and the magnetic shield plate. In the invention, however, by providing the rim 24f in the outer circumference of the flange 24c that is nearest to the clearance between the rotor and the magnetic shield plate, magnetic flux flows into the rim 24f. Therefore, leaked magnetic flux can be considerably reduced in comparison with the conventional structure.

The thickness in the axial direction of the flange 24c is small and rigidity against bending is not so high. However, the rim 24f increases the thickness of the outermost portion of the flange 24c, so that the rigidity of the flange 24c can be increased.

In the embodiment, an Nd—Fe—B-based-rare-earth sintered magnet is used as the rotor magnet 23. The outer diameter of the rotor magnet 23 is about 9.5 mm and the height in the axial direction is about 1.5 mm. The thickness of the whole spindle motor is about 4 mm. The first clearance d1 between the rotor magnet 23 and the stator 22 is about 0.15 mm. The rotor hub 24 and the flange 24c are seamlessly made of a free-cutting stainless steel obtained by adding a free-cutting component to a ferritic stainless steel as a ferromagnetic material.

The outer peripheral surface of the flange 24c extends to the outside in the radial direction of the outer peripheral surface of the rotor magnet 23 by about 0.2 mm. The second clearance d2 between the upper end surface of the rotor magnet 23 and the shield surface 24e1 of the recess 24e is about 0.04 mm, and the height of the rim 24f is about 0.04 mm.

Figure 9:
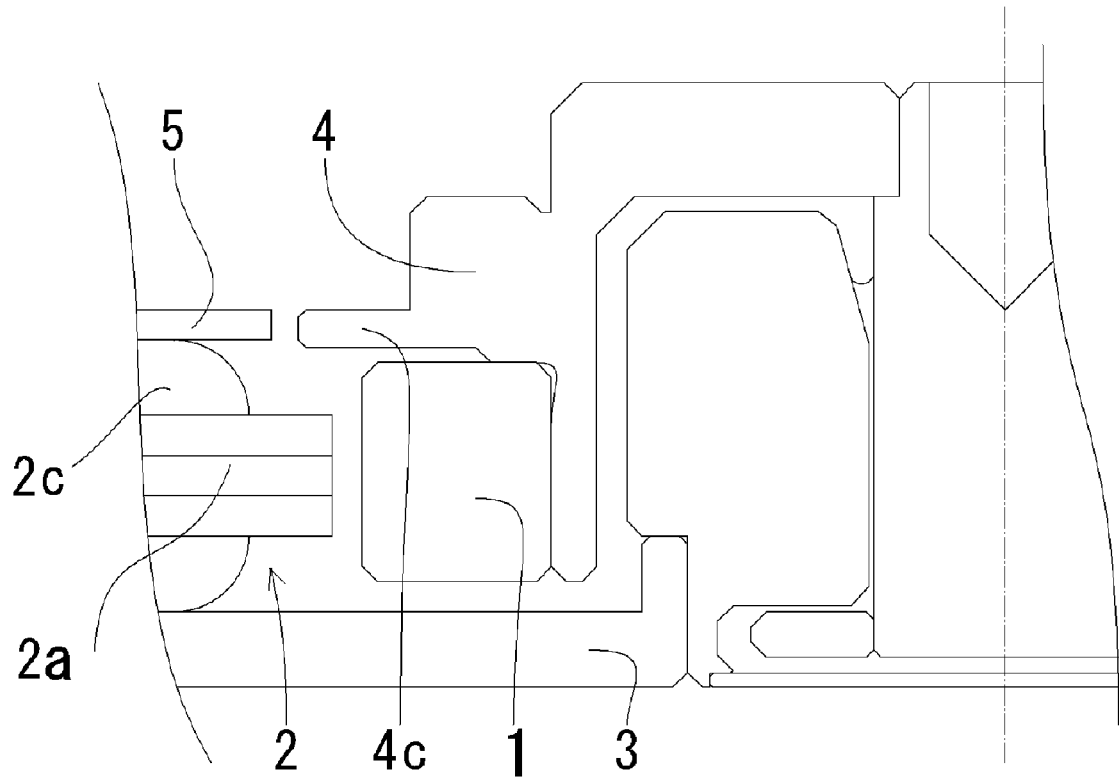
FIG. 9 is a longitudinal sectional view showing a main portion of a conventional spindle motor.

In the hard disk drive 7, the quantity of the leaked magnetic flux in an area the magnetic head 12 passes (near a disk-mounting portion 14b) was measured. In the conventional spindle motor of FIG. 9, it was about 8 gauss. In the spindle motor of the embodiment of FIG. 2, it was about 6 gauss. Thus, the quantity of leaked magnetic flux in the embodiment could be reduced by about 25% in comparison with that in the conventional spindle motor. On the other hand, torque hardly changed.

Second and Third Embodiments

Figure 5:
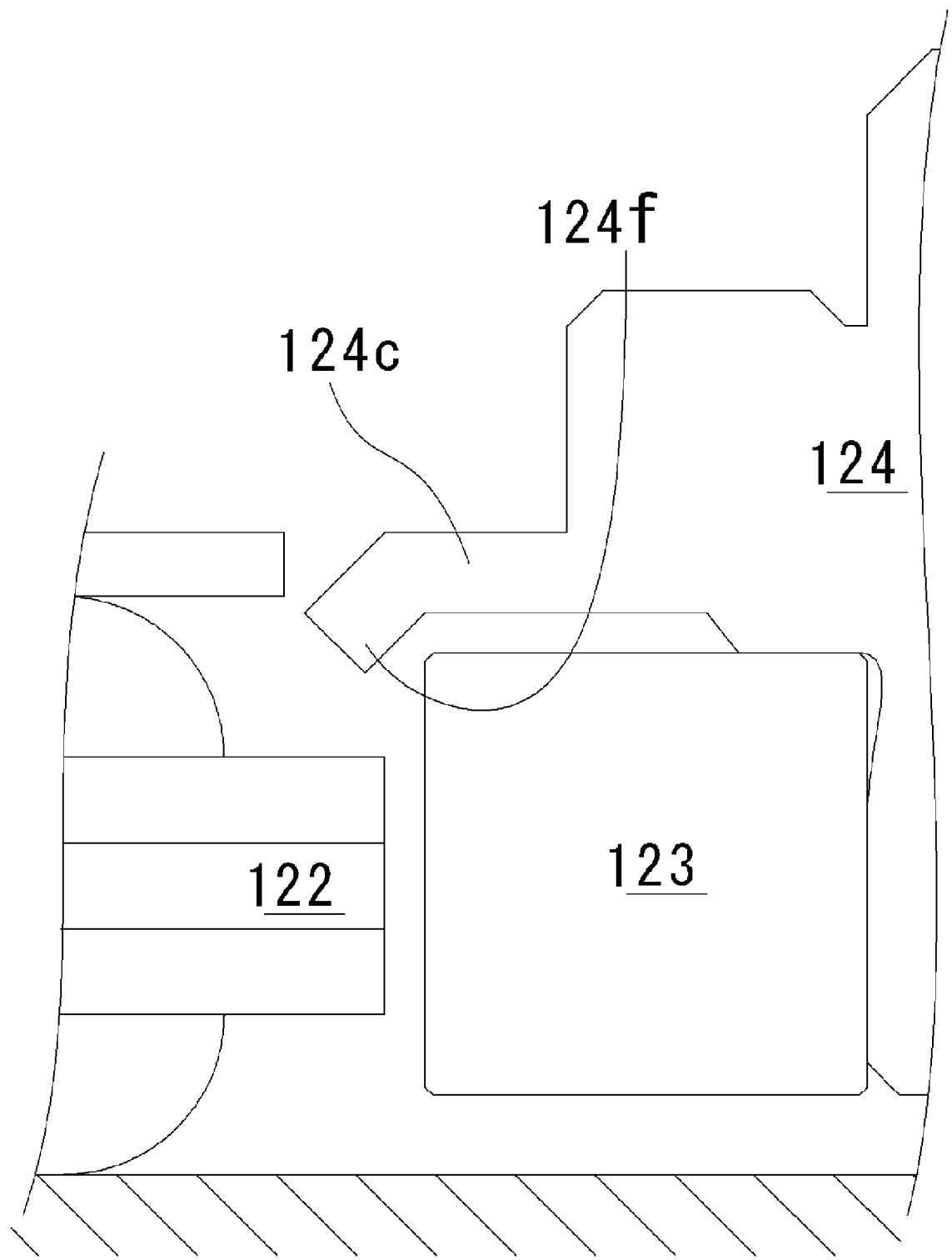
FIG. 5 is a longitudinal sectional view showing a main portion of a spindle motor according to a second embodiment of the invention.
Figure 6:
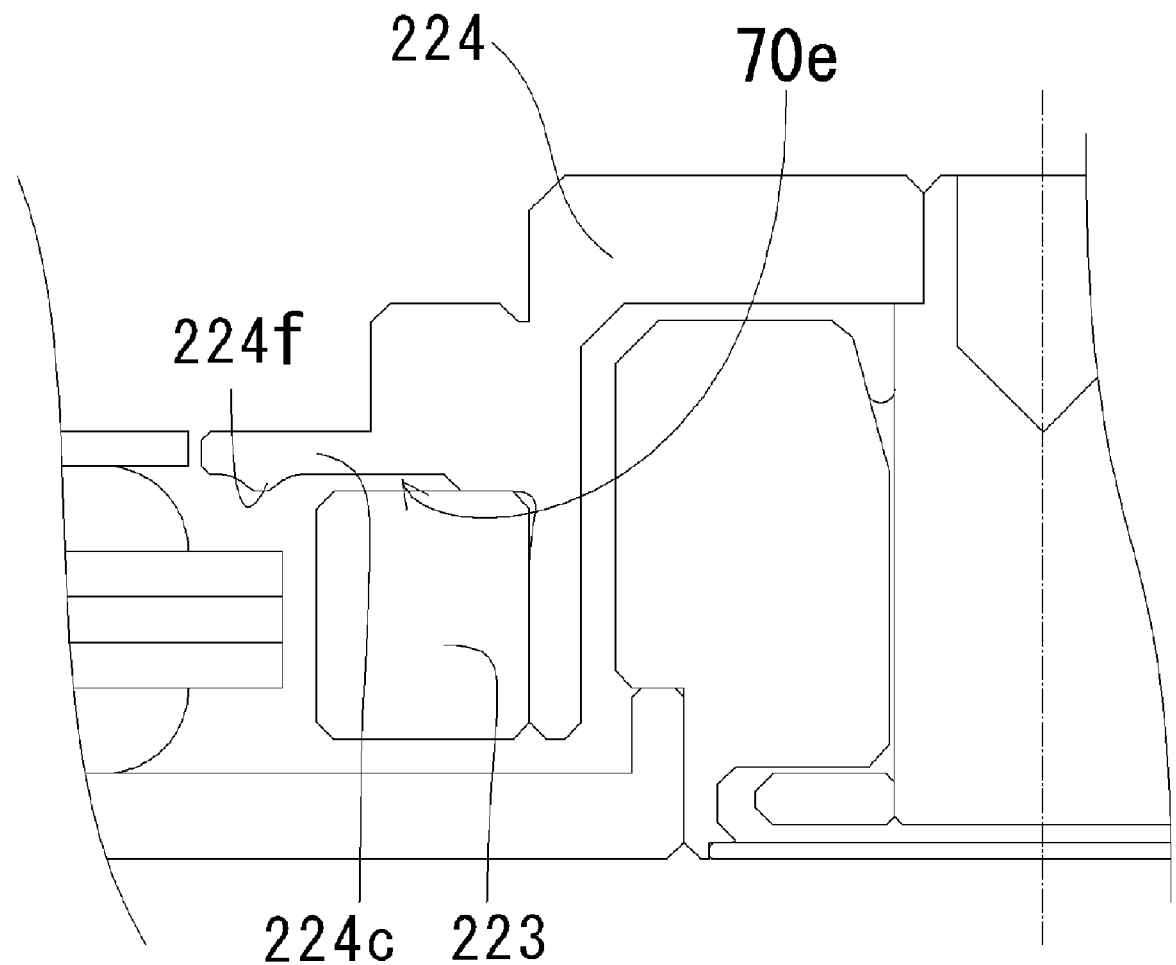
FIG. 6 is a longitudinal sectional view showing a main portion of a spindle motor according to a third embodiment of the invention.

Next, second and third embodiments of the invention will be described in detail with reference to FIGS. 5 and 6. FIGS. 5 and 6 show modifications of the structure of FIG. 2. The basic configuration is similar to that of the spindle motor of FIG. 2.

In a spindle motor of FIG. 5, a rim 124f is formed by folding the outer peripheral part in the radial direction of a flange 124c downward.

In a spindle motor of FIG. 6, a rim 224f that projects downward in the axial direction is formed in an area between the outer circumference of a rotor magnet 223 and the outer circumference of a flange 224c in the lower end of the flange 224c. In other words, the rim 224f is formed on the inside to some extent in the radial direction of the outer circumference of the flange 224c.

Also in the second and third embodiments, effects of operation similar to those of the foregoing first embodiment above can be obtained.

Fourth Embodiment

Figure 7:
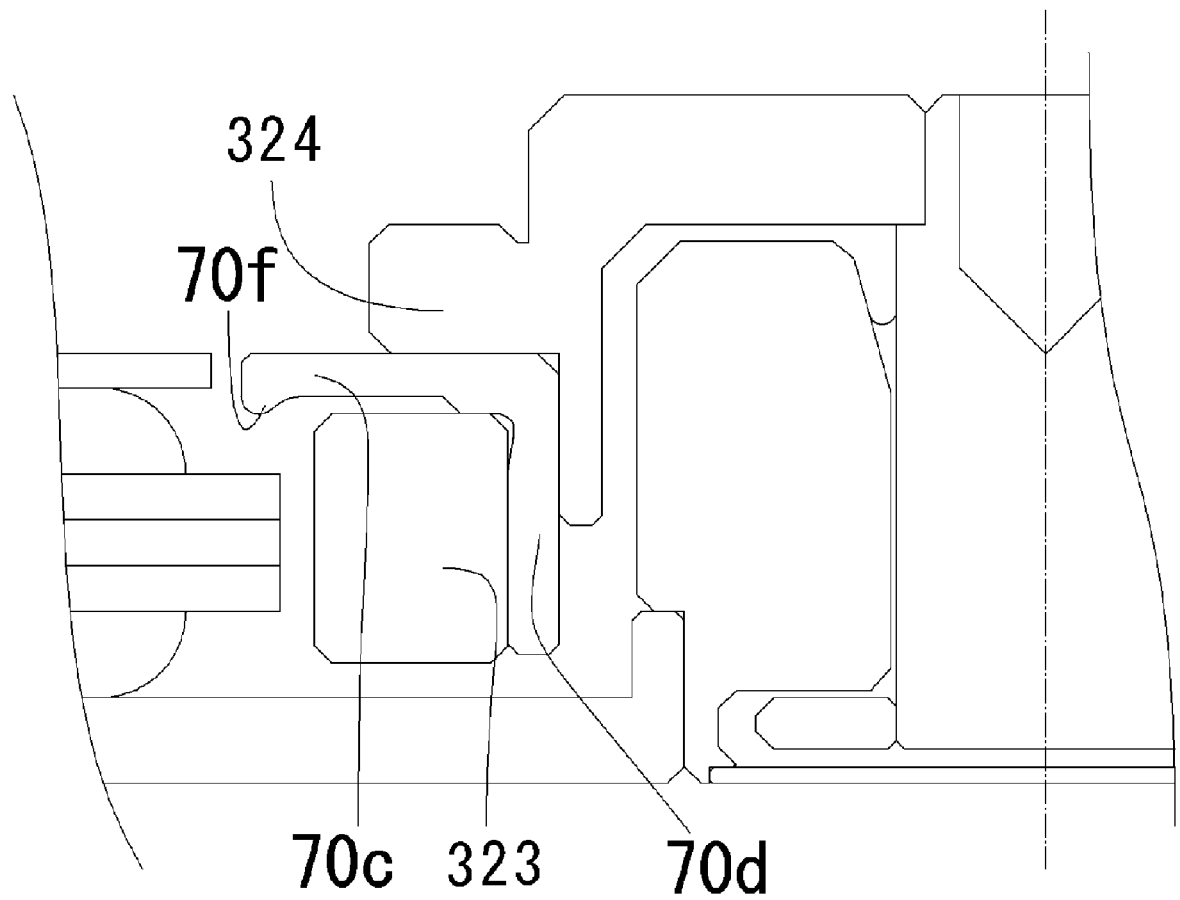
FIG. 7 is a longitudinal sectional view showing a main portion of a spindle motor according to a fourth embodiment of the invention.

A fourth embodiment of the invention will be described in detail with reference to FIG. 7. FIG. 7 shows a modification of the structure of FIG. 2 and a basic configuration of FIG. 7 is similar to that of the spindle motor of FIG. 2.

A yoke 70 having an almost L shape in section is in contact with and held by the outer periphery of a rotor hub 324, and an annular rotor magnet 323 is held by the inner periphery of the yoke 70. The yoke 70 is made of a ferromagnetic material and includes the cylindrical portion 70b extending downward in the axial direction and the flange 70c extending from an upper end of the cylindrical portion 70b to the outside in the radial direction. In the outermost portion of the flange 70c, a rim 70f projected downward in the axial direction is formed. The rotor hub 324 is formed of aluminium, aluminium alloy, stainless steel or the like. The yoke 70 is formed of ferritic stainless steel, martensitic stainless steel, silicon steel, mild steel, other steels, nickel, nickel alloy, or the like.

In the fourth embodiment, even in the case such that a rotor hub is made of the nonmagnetic material, by attaching a yoke having a rim formed of a ferromagnetic material to the rotor hub, effects of operation similar to those in the first embodiment can be obtained.

REFERENCE EXAMPLE

Figure 8:
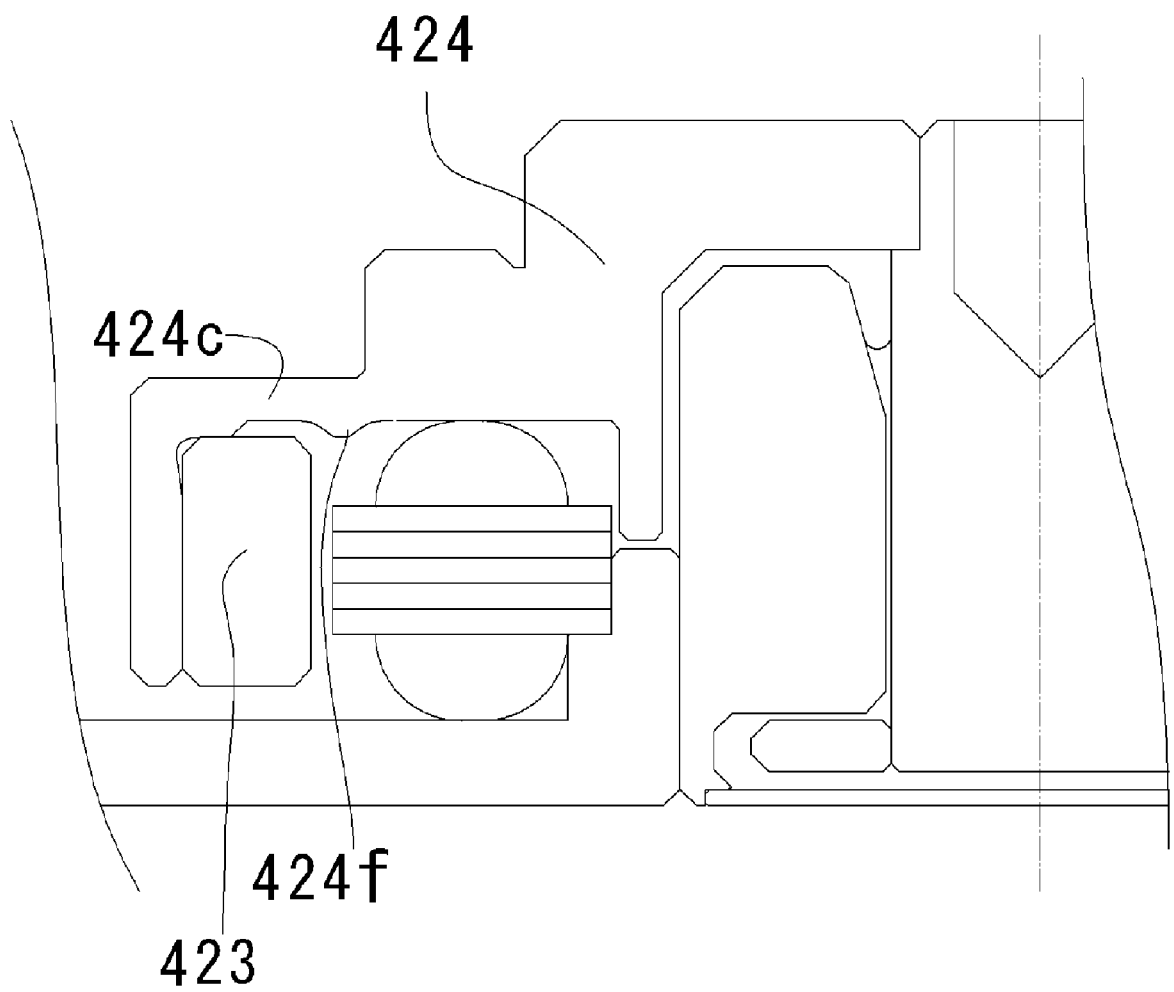
FIG. 8 is a longitudinal sectional view showing a main portion of a spindle motor as a reference example.

A reference example of the invention will be described in detail with reference to FIG. 8. FIG. 8 shows the reference example of the structure of FIG. 2 and a basic structure is similar to that of the spindle motor in FIG. 2.

FIG. 8 shows an outer-rotor-type spindle motor. A rotor magnet 423 is held by the inner circumference of a rotor hub

424. A rim 424f projected downward in the axial direction is formed on the inside in the radial direction of the inner circumference of the rotor magnet 423 in the lower end of a flange 424c of the rotor hub 424.

Also in the reference example, effects of operation similar to those of the first embodiment can be obtained.

Although the embodiments of the rotor hub, the spindle motor, and the recording disk driving apparatus according to the invention have been described above, the invention is not limited to each of the foregoing embodiments but can be variously changed or modified without departing from the scope of the invention.

For example, even in the case where a shield plate is not attached, the magnetic flux leaked to the side of the recording disk mounting portion out of the magnetic flux leaked from the rotor magnet is captured and the leaked magnetic flux is reduced. Thus, effects of the invention can be obtained.

The rim may be formed in a portion having high magnetic flux density in the rotor magnet, that is, a part of a flange corresponding to the loop of a polarization waveform of a rotor magnet in the circumferential direction. In this case as well, leaked magnetic flux can be reduced.

The number of magnetic poles of each of the teeth and the rotor magnet is not limited to that in the structure of FIG. 4.

As the bearing of the spindle motor according to each of the foregoing embodiments, for example, a so-called gas dynamic pressure bearing using air as fluid may be used. The invention is not always limited to a bearing using fluid dynamic pressure but, for example, a ball bearing may be employed.

What is claimed is:

1. A spindle motor for holding and rotating a data storage disk, comprising:
    a stator including a plurality of teeth disposed in a radial pattern about a central axis extending in an axial direction of the motor, and coils disposed around the teeth, respectively; and
    a rotor supported in the motor so as to be rotatable about the central axis, wherein the rotor includes
        a rotor magnet having an end surface, and a peripheral surface along which poles of the magnet lie, the poles facing and spaced from the plurality of teeth in a radial direction of the motor such that a radial first clearance exists between the peripheral surface of the rotor magnet and the teeth,
        a disk supporting portion having a support surface and dedicated and configured to support the data storage disk, and
        a flange of ferromagnetic material juxtaposed with the rotor magnet in the axial direction of the motor, the support surface of the disk mounting portion and the flange being offset from one another in the axial direction of the motor, and
        the flange having a shield surface that faces and is spaced from the end surface of the rotor magnet one way in the axial direction of the motor such that an axial second clearance exists between the end surface of the rotor magnet and the shield surface of the flange, and a rim projecting from the shield surface back the other way in the axial direction of the motor such that the rim and the support surface of the disk supporting portion of the rotor face in opposite directions, the rim extending along an annulus offset from the peripheral surface of the rotor magnet in the radial direction of the motor,
        wherein the rim is located over the teeth of the stator in the axial direction such that no portion of flange projects between the peripheral surface of the rotor magnet and the teeth.

2. The spindle motor according to claim 1, wherein the rotor also has a cylindrical portion made of ferromagnetic material so as to have inner and outer peripheral surfaces, the rotor magnet being held against one of the peripheral surfaces of the cylindrical portion.

3. The spindle motor according to claim 2, wherein the flange has a recess therein the bottom of which is delimited by the shield surface, and a portion of the flange adjacent either a radially outer edge or a radially inner edge of the recess contacts the end surface of the rotor magnet.

4. The spindle motor according to claim 2, wherein the rim extends along the outermost peripheral portion of the flange.

5. The spindle motor according to claim 1, wherein the flange has a recess therein the bottom of which is delimited by the shield surface, and a portion of that flange adjacent either a radially outer edge or a radially inner edge of the recess contacts the end surface of the rotor magnet.

6. The spindle motor according to claim 5, wherein the rim extends along the outermost peripheral portion of the flange.

7. The spindle motor according to claim 1, wherein the rim extends along the outermost peripheral portion of the flange.

8. The spindle motor according to claim 7, wherein a distance from the center axis to the tip of the rim in the axial direction is equal to or larger than the mean of a distance between the center axis and the outer peripheral surface of the rotor magnet and a distance between the center axis and an inner peripheral surface of the plurality teeth.

9. The spindle motor according to claim 1, wherein a distance from the center axis to the tip of the rim in the axial direction is equal to or larger than the mean of a distance between the center axis and the outer peripheral surface of the rotor magnet and a distance between the center axis and an inner peripheral surface of the plurality teeth.

10. The spindle motor according to claim 1, wherein the tip of the rim of said flange faces and is spaced from the teeth of the stator in the axial direction such that an axial third clearance exists between the tip of the rim and the teeth, the third clearance being larger than the first clearance.

11. The spindle motor according to claim 1, further comprising a shield plate of ferromagnetic material disposed over the stator so as to provide a magnetic shield over the stator, the shield plate having an inner peripheral edge confronting an outer peripheral edge of the flange in the radial direction.

12. The spindle motor according to claim 11, wherein the inner edge of the shield plate and the outer peripheral edge of the flange are spaced in the radial direction such that a second radial clearance exists between the inner peripheral edge of the shield plate and the outer peripheral edge of the flange, the second radial clearance being smaller than the first clearance.

13. The spindle motor according to claim 2, wherein the rotor comprises a rotor hub having said disk supporting portion, and a discrete yoke of ferromagnetic material fixed to the rotor hub, the yoke having said flange.

14. The spindle motor according to claim 13, wherein the yoke has a cylindrical portion from which the flange extends radially such that the cylindrical portion and the flange together have an L-shaped sectional profile, and the rotor magnet is secured to the yoke as in contact with at least the cylindrical portion of the yoke.

15. The spindle motor according to claim 14, wherein the flange has a recess therein the bottom of which is delimited by the shield surface, and a portion of the flange adjacent a radially inner edge of the recess contacts the end surface of the rotor magnet.

16. The spindle motor according to claim 1, wherein the tip of the rim of said flange faces and is spaced from the teeth of the stator in the axial direction such that an axial third clearance exists between the tip of the rim and the teeth, and the inner edge of the shield plate and the outer peripheral edge of the flange are spaced in the radial direction such that a radial fourth clearance exists between the inner peripheral edge of the shield plate and the outer peripheral edge of the flange, the fourth clearance being smaller than the third clearance.

17. The spindle motor according to claim 1, wherein the teeth of the stator are disposed radially inwardly of the rotor magnet, and the rotor magnet has a radially inner peripheral surface along which the poles of the magnet lie.

18. A disk driving apparatus comprising:
a housing;
a data storage disk;
a spindle motor fixed to and disposed within the housing the spindle motor comprising
a stator including a plurality of teeth disposed in a radial pattern about a central axis extending in an axial direction of the motor, and coils disposed around the teeth, respectively, and
a rotor supported in the motor so as to be rotatable about the central axis, the data storage disk being mounted to the rotor so as to rotate with the rotor, and wherein the rotor has
a rotor magnet having an end surface, and a peripheral surface along which poles of the magnet lie, the poles facing and spaced from the plurality of teeth in a radial direction of the motor such that a radial clearance exists between the peripheral surface of the rotor magnet and the teeth,
a disk supporting portion having a support surface which supports the data storage disk, and
a flange of ferromagnetic material juxtaposed with the rotor magnet in the axial direction of the motor, the support surface of the disk mounting portion and the flange being offset from one another in the axial direction of the motor, and
the flange having a shield surface that faces and is spaced from the end surface of the rotor magnet one way in the axial direction of the motor such that an axial second clearance exists between the end surface of the rotor magnet and the shield surface of the flange, and a rim projecting from the shield surface back the other way in the axial direction of the motor such that the rim and the support surface of the disk supporting portion of the rotor face in opposite directions, the rim extending along an annulus offset from the peripheral surface of the rotor magnet in the radial direction of the motor, wherein the rim is located over the teeth of the stator in the axial direction such that no portion of flange projects between the peripheral surface of the rotor magnet and the teeth; and
an access unit including a head movable across a surface of the data storage disk to access the disk.

19. The disk driving apparatus according to claim 18, further comprising a shield plate of ferromagnetic material disposed over the stator so as to provide a magnetic shield over the stator, the shield plate having an inner peripheral edge confronting an outer peripheral edge of the flange in the radial direction, and wherein the inner edge of the shield plate and the outer peripheral edge of the flange are spaced in the radial direction such that a second radial clearance exists between the inner peripheral edge of the shield plate and the outer peripheral edge of the flange, the second radial clearance being smaller than the first clearance.

20. A rotor hub of a spindle motor for use in holding and rotating a data storage disk, the rotor hub having a central axis extending in an axial direction, and the rotor hub comprising:
a radially extending flange made of a ferromagnetic material; and
a disk supporting portion having a support surface dedicated and configured to support a data storage disk, the disk supporting portion and the flange being offset from one another in the axial direction, and
wherein the flange includes a recess therein the bottom of which is delimited by a shield surface, and a rotor magnet-contacting surface adjacent either a radially outer edge or a radially inner edge of the recess, the rotor magnet-contacting surface and the shield surface being offset from in the axial direction, and
wherein the flange includes the shield surface that faces in the axial direction away from the support surface of the disk supporting portion, and a rim projecting from the shield surface in the axial direction, wherein the rim and the support surface of the disk supporting portion of the rotor hub face in opposite directions, and wherein no portion of the rim of the flange projects axially below the rotor magnet-contacting surface of the flange.

21. The rotor hub according to claim 20, wherein the rotor hub further comprises a cylindrical portion of ferromagnetic material, the flange extending radially from the cylindrical portion, and the cylindrical portion and the flange delimiting an annular recess configured to receive a rotor magnet.

22. The rotor hub according to claim 20, wherein the rim is located at a radially outermost peripheral portion of the flange.

* * * * *